United States Patent
Isurugi et al.

(10) Patent No.: US 9,405,043 B2
(45) Date of Patent: *Aug. 2, 2016

(54) MOLD AND PROCESS FOR PRODUCTION OF MOLD

(75) Inventors: Akinobu Isurugi, Osaka (JP); Kiyoshi Minoura, Osaka (JP); Hidekazu Hayashi, Osaka (JP); Kenichiro Nakamatsu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 831 days.

This patent is subject to a terminal disclaimer.

(21) Appl. No.: 13/643,632

(22) PCT Filed: Apr. 1, 2011

(86) PCT No.: PCT/JP2011/058392
§ 371 (c)(1),
(2), (4) Date: Nov. 20, 2012

(87) PCT Pub. No.: WO2011/135976
PCT Pub. Date: Nov. 3, 2011

(65) Prior Publication Data
US 2013/0094089 A1   Apr. 18, 2013

(30) Foreign Application Priority Data
Apr. 28, 2010 (JP) .................... 2010-103935

(51) Int. Cl.
*G02B 1/11* (2015.01)
*C25D 11/14* (2006.01)
(Continued)

(52) U.S. Cl.
CPC ............. *G02B 1/11* (2013.01); *B29C 33/424* (2013.01); *B29C 33/56* (2013.01);
(Continued)

(58) Field of Classification Search
CPC ............. B29D 7/01; B44C 1/22; C23F 1/04
USPC .......... 216/11, 56, 83, 96, 102; 359/601; 425/385
See application file for complete search history.

(56) References Cited

U.S. PATENT DOCUMENTS 2,628,927 A * 2/1953 Colbert et al. ............. 428/336
6,359,735 B1 3/2002 Gombert et al.
(Continued)

FOREIGN PATENT DOCUMENTS

JP 2001517319 A 10/2001
JP 2003531962 A 10/2003
(Continued)

OTHER PUBLICATIONS

International Search Report PCT/ISA/210.
(Continued)

*Primary Examiner* — James Lin
*Assistant Examiner* — Leo Ahnn
(74) *Attorney, Agent, or Firm* — Harness, Dickey & Pierce, P.L.C.

(57) ABSTRACT

A mold manufacturing method of an embodiment of the present invention includes the steps of: (a) providing a mold base; (b) partially anodizing the aluminum layer to form a porous alumina layer, the porous alumina layer having a porous layer which defines a plurality of minute recessed portions and a barrier layer which is provided at a bottom of each of the plurality of minute recessed portions; and (c) after step (b), performing etching, thereby enlarging the plurality of minute recessed portions of the porous alumina layer, wherein in step (c) the etching is performed such that an average depth of the plurality of minute recessed portions increases but does not exceed a $\frac{1}{7}$ of an average thickness of the barrier layer before the etching.

11 Claims, 10 Drawing Sheets

(51) Int. Cl.
　　　*C23F 1/04*　　　(2006.01)
　　　*G02B 1/118*　　(2015.01)
　　　*B29C 33/42*　　(2006.01)
　　　*B29C 33/56*　　(2006.01)
　　　*B29D 11/00*　　(2006.01)
　　　*C25D 11/12*　　(2006.01)
　　　*C25D 11/24*　　(2006.01)
　　　*C25D 11/10*　　(2006.01)

(52) U.S. Cl.
　　　CPC ..... *B29D 11/0048* (2013.01); *B29D 11/00865* (2013.01); *C23F 1/04* (2013.01); *C25D 11/12* (2013.01); *C25D 11/24* (2013.01); *G02B 1/118* (2013.01); *C25D 11/10* (2013.01)

(56) References Cited

U.S. PATENT DOCUMENTS

| | | | |
|---|---|---|---|
| 8,580,135 B2 * | 11/2013 | Hayashi | B29C 33/38 205/175 |
| 2003/0205475 A1 | 11/2003 | Sawitowski | |
| 2007/0159698 A1 * | 7/2007 | Taguchi et al. | 359/586 |
| 2008/0121528 A1 | 5/2008 | Bench et al. | |
| 2010/0086733 A1 | 4/2010 | Nakata | |
| 2010/0243458 A1 | 9/2010 | Kojima et al. | |
| 2012/0018613 A1 | 1/2012 | Hayashi et al. | |

FOREIGN PATENT DOCUMENTS

| | | |
|---|---|---|
| JP | 2005156695 A | 6/2005 |
| JP | 2010-090430 A | 4/2010 |
| TW | 200940320 | 10/2009 |
| WO | WO-2006059686 A1 | 6/2006 |
| WO | WO-2010116728 A1 | 10/2010 |
| WO | WO 2010125795 A1 * | 11/2010 |

OTHER PUBLICATIONS

International Preliminary Report on Patentability dated Dec. 20, 2012.

* cited by examiner (a)

(b)

(c)

(d)

(e)

(a)

BUFFER LAYER

INORGANIC UNDERLAYER (b)

VACANCY

PERMEATION (a)

(b)

(c)

(a)          (b)

(a)          (b)

(a)

(b)

MOLD AND PROCESS FOR PRODUCTION OF MOLD

TECHNICAL FIELD

The present invention relates to a mold and a mold manufacturing method. In this specification, the "mold" includes molds that are for use in various processing methods (stamping and casting), and is sometimes referred to as a stamper. The "mold" can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. When light is transmitted through the interface between media of different refractive indices (e.g., when light is incident on the interface between air and glass), the antireflection technique prevents decrease of the amount of transmitted light which may be attributed to, for example, Fresnel reflection, and as a result, the visibility improves.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented. The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost. As the method of forming such a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. A base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

Patent Document 4 discloses the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 μm and less than 100 μm. The entire disclosures of Patent Documents 1, 2, and 4 are herein incorporated by reference.

Utilizing an anodized porous aluminum film as described above can facilitate the manufacture of a mold which is used for formation of a moth-eye structure over a surface (hereinafter, "moth-eye mold"). In particular, as described in Patent Documents 2 and 4, when the surface of the anodized aluminum film as formed is used as a mold without any modification, the manufacturing cost can be reduced. In this specification, the structure of the surface of a moth-eye mold which is capable of forming a moth-eye structure by means of transfer, for example, is herein referred to as "inverted moth-eye structure".

CITATION LIST

Patent Literature

Patent Document 1: Japanese PCT National Phase Laid-Open Publication No. 2001-517319

Patent Document 2: Japanese PCT National Phase Laid-Open Publication No. 2003-531962

Patent Document 3: Japanese Laid-Open Patent Publication No. 2005-156695

Patent Document 4: WO 2006/059686

SUMMARY OF INVENTION

Technical Problem

When a moth-eye mold is manufactured using a bulk material of aluminum, performing anodization and etching on that bulk material may lead not only to formation of micropores (about several hundreds of nanometers in diameter) but also to formation of pits which are larger than the micropores (e.g., about 1 μm in diameter) in a porous alumina layer formed over the surface of the bulk material because the bulk material that has sufficient rigidity contains an impurity. When a moth-eye mold is manufactured by directly forming an aluminum layer on a base, the aluminum layer may readily peel off from the base.

The adhesive property between the base and the aluminum layer can be improved by providing an inorganic underlayer and a buffer layer between the base and the aluminum layer. However, the present inventor found that providing the inorganic underlayer and the buffer layer in that way can cause defects in a formed porous alumina layer, and the defects can deteriorate the adhesive property of the aluminum layer.

The present invention was conceived for the purpose of solving the above problems. One of the major objects of the present invention is to provide a mold manufacturing method which is capable of preventing the deterioration of the adhesive property.

Solution to Problem

A mold manufacturing method of the present invention is a method for manufacturing a mold which has an inverted moth-eye structure over its surface, the inverted moth-eye structure having a plurality of recessed portions whose two-dimensional size viewed in a direction normal to its surface is not less than 10 nm and less than 500 nm, the method including the steps of: (a) providing a mold base, the mold base including a base, an inorganic underlayer provided on the base, a buffer layer provided on the inorganic underlayer, and an aluminum layer provided on the buffer layer; (b) partially anodizing the aluminum layer to form a porous alumina layer, the porous alumina layer having a porous layer which defines a plurality of minute recessed portions and a barrier layer which is provided at a bottom of each of the plurality of minute recessed portions; and (c) after step (b), bringing the porous alumina layer into contact with an etching solution to perform etching, thereby enlarging the plurality of minute recessed portions of the porous alumina layer, wherein in step (c) the etching is performed such that an average depth of the plurality of minute recessed portions increases but does not exceed a 1/7 of an average thickness of the barrier layer before the etching.

In one embodiment, in step (c) the average thickness of the barrier layer before the etching is not less than 5 nm and not more than 250 nm.

In one embodiment, in step (c) the average thickness of the barrier layer before the etching is not less than 5 nm and not more than 180 nm.

In one embodiment, in step (c) the average thickness of the barrier layer before the etching is not less than 85 nm and not more than 95 nm.

In one embodiment, in step (c) an increase of the average depth is not less than 5 nm and not more than 12 nm.

In one embodiment, the manufacturing method further includes the step of: (d) after step (c), further anodizing the aluminum layer to grow the plurality of minute recessed portions.

In one embodiment, in step (c) a phosphoric acid aqueous solution is used as the etching solution.

In one embodiment, in step (a) the buffer layer includes an aluminum oxide layer.

In one embodiment, the aluminum oxide layer is formed by sputtering of aluminum in an oxygen atmosphere.

A mold of the present invention is a mold which is manufactured according to any of the above-described manufacturing methods, wherein the porous alumina layer has the inverted moth-eye structure over its surface.

An antireflection film of the present invention is an antireflection film which is produced using the above-described mold, the antireflection film having a surface which is provided with a moth-eye structure.

Advantageous Effects of Invention

According to the present invention, deterioration of the adhesive property of an aluminum layer can be prevented.

DESCRIPTION OF EMBODIMENTS

Hereinafter, embodiments of a moth-eye mold and a moth-eye mold manufacturing method according to the present invention are described with reference to the drawings.

Figure 1:
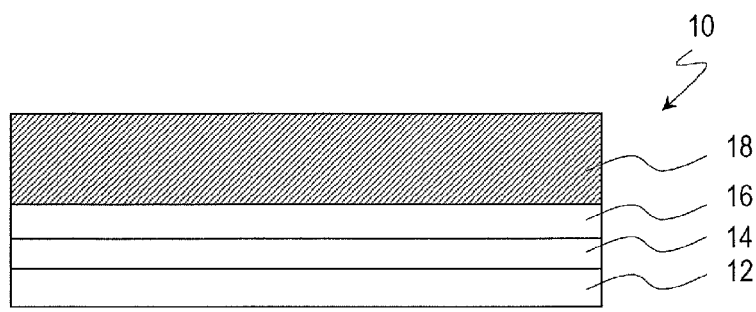
FIG. 1 (a) to (e) are schematic diagrams for illustrating an embodiment of a moth-eye mold manufacturing method of the present invention.
Figure 1:
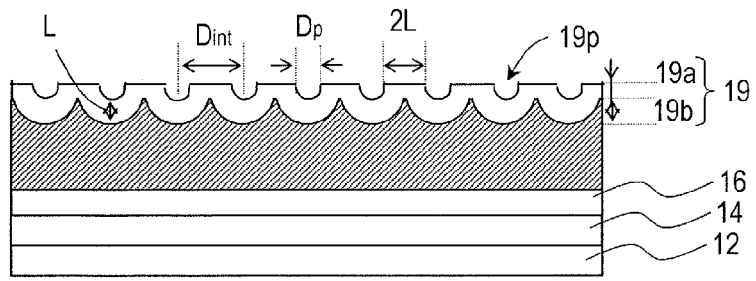
Figure 1:
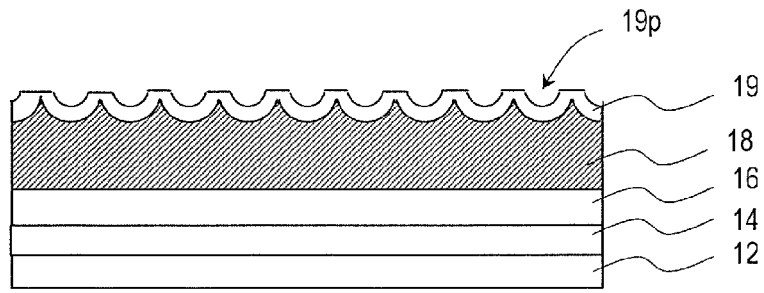
Figure 1:
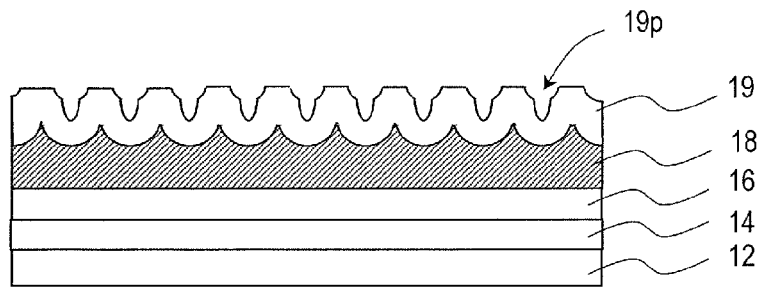
Figure 1:
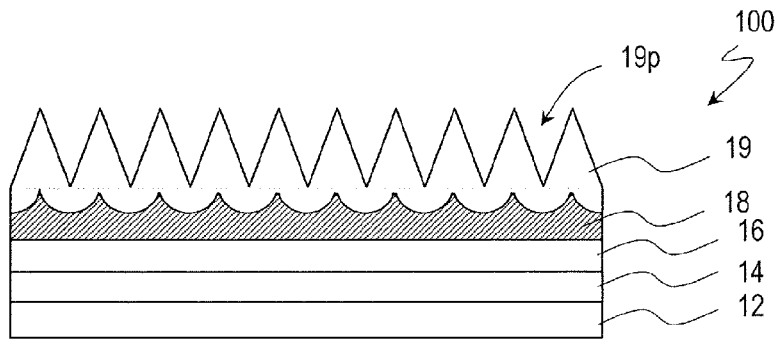

Hereinafter, a moth-eye mold manufacturing method of the present embodiment is described with reference to FIG. 1. Firstly, a mold base 10 is provided as shown in FIG. 1(a). The mold base 10 includes a base 12, an inorganic underlayer 14 provided on the base 12, a buffer layer 16 provided on the inorganic underlayer 14, and an aluminum layer 18 provided on the buffer layer 16.

For example, the base 12 may be made of an organic insulating material. Alternatively, the base 12 may include an organic insulating layer, which is made of an organic insulating material, on the surface of a support that is made of a metal or the like. The support may have the shape of a thin plate or may have the shape of a hollow cylinder. The organic insulating material may be, for example, a resin. When the surface of the base 12 is made of the organic insulating material, it is preferred to perform plasma ashing on the surface of the base 12. Performing plasma ashing can improve the adhesion of the aluminum layer 18. Alternatively, the base 12 may be a glass base.

For example, the base 12 may be made of Polyethylene Terephthalate (PET) or Triacetyl Cellulose (TAC).

Alternatively, the base 12 may be formed by, for example, applying a curable resin to the outer perimeter surface of the support to form a curable resin layer and thereafter curing the curable resin such that an organic insulating layer on the outer perimeter surface of the support. In this case, the thickness of the organic insulating layer is adjusted to be not less than 7 µm, whereby the insulation can be ensured. The curable resin layer may be made of an electrodeposition material or a spray painting material.

The curable resin layer may be formed by means of electrodeposition, for example. The electrodeposition may be, for example, a known electrodeposition painting method. For example, firstly, the support (e.g., stainless steel) is washed. Then, the support is immersed in an electrodeposition bath in which an electrodeposition solution that contains an electrodeposition resin is stored. In the electrodeposition bath, an electrode is installed. When the curable resin layer is formed by means of cationic electrodeposition, for example, an electric current is allowed to flow between the support and the anode, where the support serves as the cathode and the electrode installed in the electrodeposition bath serves as the anode, so that the electrodeposition resin is deposited on the outer perimeter surface of the support, whereby the curable resin layer is formed. When the curable resin layer is formed by means of anionic electrodeposition, an electric current is allowed to flow, where the support serves as the anode and the electrode installed in the electrodeposition bath serves as the cathode, whereby the curable resin layer is formed.

Thereafter, the washing step and the baking step are performed, whereby an organic insulating layer is formed. The electrodeposition resin used may be, for example, a polyimide resin, an epoxy resin, an acrylic resin, a melamine resin, a urethane resin, or a mixture thereof.

A method for forming the curable resin layer other than the electrodeposition is, for example, spray painting. The curable resin layer can be formed on the outer perimeter surface of the support (e.g., stainless steel) using, for example, a urethane resin or a polyamic acid according to a spray coating method or an electrostatic painting method. The urethane resin may be, for example, an UreTop product manufactured by Nippon Paint Co., Ltd.

The inorganic underlayer 14 is directly formed on the base 12. In view of the adhesion with the glass base, the inorganic underlayer 14 is preferably made of an inorganic oxide or an inorganic nitride. When an inorganic oxide is used, for example, the inorganic underlayer 14 is preferably a silicon oxide layer or a titanium oxide layer. When an inorganic nitride is used, for example, the inorganic underlayer 14 is preferably a silicon nitride layer. It is also preferred that the thermal expansion coefficient of the inorganic underlayer 14 is adapted by adding an impurity to the inorganic oxide layer or inorganic nitride layer. For example, when a silicon oxide layer is used, the thermal expansion coefficient can be increased by adding germanium (Ge), phosphorus (P), or boron (B). When 5 mass % Ge is added to the silicon oxide, for example, the thermal expansion coefficient is about $2.8 \times 10^{-6}/°$C., which is about three times that obtained when Ge is not added.

The thickness of the inorganic underlayer 14 is preferably not less than 40 nm and, more preferably, not less than 100 nm. Further, the thickness of the inorganic underlayer 14 is preferably not more than 500 nm and, more preferably, not more than 200 nm. If the thickness of the inorganic underlayer 14 is more than 500 nm, the time required for formation of the inorganic underlayer 14 will be unduly long. In the case where the base 112 has flexibility, if the thickness of the inorganic underlayer 14 is more than 500 nm, a crack may be formed in the inorganic underlayer 14 when the base 112 is bent. For example, a silicon oxide layer ($SiO_2$) with a thickness of not less than 50 nm and not more than 200 nm is preferably used as the inorganic underlayer 14.

The buffer layer 16 is provided between the inorganic underlayer 14 and the aluminum layer 18. The buffer layer 16 has the function of improving the adhesive property between the inorganic underlayer 14 and the aluminum layer 18. The buffer layer 16 preferably contains aluminum and either of oxygen or nitrogen. The thickness of the buffer layer 16 is preferably not less than 10 nm and, more preferably, not less than 2 nm. The thickness of the buffer layer 16 is preferably not more than 1000 nm. If the thickness of the buffer layer 16 is less than 10 nm, sufficient adhesion may not be obtained between the inorganic underlayer 14 and the aluminum layer 18. If the thickness of the buffer layer 16 is more than 1000 nm, disadvantageously, the time required for formation of the buffer layer 16 will be unduly long. For example, it is preferred that the buffer layer 16 is an aluminum oxide layer which has a thickness of not less than 10 nm and not more than 1000 nm. For example, the aluminum oxide layer may be formed by sputtering in an oxygen atmosphere. In this case, the adhesion increases as the power for the sputtering is higher. It is inferred that the difference in adhesion is attributed to the difference in film quality of the buffer layer, which is attributed to the difference in the sputtering power for the buffer layer. Note that the buffer layer 16 may contain titanium and either of oxygen or nitrogen.

The profile of the aluminum content in the buffer layer 16 along the thickness direction may vary stepwise or may continuously vary although it may be constant. For example, when the buffer layer 16 is formed of aluminum and oxygen, a plurality of aluminum oxide layers which have gradually decreasing oxygen contents are formed, and then, the aluminum layer 18 is formed on the uppermost aluminum oxide layer. This process also applies to a case where the buffer layer 16 is formed of aluminum and nitrogen. With such a variation of the profile, the physical property values, such as the thermal expansion coefficient, can be conformed.

The aluminum layer 18 may be formed using a known method (e.g., electron beam deposition or sputtering). For example, the aluminum layer 18 may be formed by sputtering of an aluminum target with the purity of, for example, 99.99 mass %. The thickness of the aluminum layer 18 is preferably not less than 500 nm for the purpose of obtaining an anodized aluminum layer which has a surface structure that serves as a moth-eye mold. From the viewpoint of productivity, the thickness of the aluminum layer 18 is preferably not more than 3000 nm. For example, the thickness of the aluminum layer 18 is 1000 nm (1 µm).

The aluminum layer 18 is preferably formed through a plurality of separate cycles rather than formed at once in one cycle. Specifically, it is preferred to repeat the cycle of depositing aluminum to a certain thickness before an intermission of a certain time period and resuming the deposition after the intermission (e.g., after the passage of 5 minutes) till the aluminum layer 18 having a predetermined thickness (e.g., 1 µm) is obtained, rather than to continuously deposit aluminum to the predetermined thickness. For example, it is preferred that the aluminum layer 18 having a thickness of about 1 µm is obtained by forming 20 aluminum layers each of which has a thickness of 50 nm in such a manner that every formation of the 50 nm thick aluminum layer is followed by an intermission. In this way, the deposition of aluminum is carried out in a plurality of separate cycles, whereby the quality of the finally-obtained aluminum layer 18 (e.g., the chemical resistance or adhesion) can be improved. This is probably because continuous deposition of aluminum increases the temperature of a base (a base having a surface on which the aluminum layer is to be formed), and as a result, the distribution of thermal stress in the aluminum layer 18 becomes nonuniform so that the film quality deteriorates.

In order to uniformly anodize the aluminum layer 18, a conductive layer (preferably, a valve metal layer) may be provided as a backing. This conductive layer is preferably provided between the inorganic underlayer 14 and the buffer layer 16 or between the buffer layer 16 and the aluminum layer 18. To prevent occurrence of electrochemical corrosion, the conductive layer is preferably made of a material which has a small difference in standard electrode potential from aluminum, such as titanium, magnesium, or the like. Titanium is known to have the effect of improving adhesion.

Then, part of the aluminum layer 18 (surface portion) is anodized under predetermined conditions to form a porous alumina layer 19 which includes a porous layer 19a that defines micropores (minute recessed portions) 19p and a barrier layer 19b that is provided at the bottom of the micropores 19p as shown in FIG. 1(b). Note that the average adjoining distance of the micropores, $D_{int}$, is represented by the sum of the average thickness of the micropore wall, 2L, and the average pore diameter of the micropores, $D_p$. Note that the thickness of the micropore wall is equal to the thickness of the barrier layer, L, and therefore, the average thickness of the entire micropore wall that separates two micropores is represented by 2L.

The pore formation density, pore diameter, pore depth, etc., of the micropores 19p can be controlled by changing the conditions of the anodization (for example, the forming voltage, the type and concentration of the electrolytic solution, as well as the duration of anodization). Also, the regularity of arrangement of the micropores 19p can be controlled by controlling the level of the forming voltage. The electrolytic solution used may be, for example, an acidic aqueous solution which contains an acid selected from the group consisting of oxalic acid, tartaric acid, phosphoric acid, chromic acid, citric acid, and malic acid.

Note that the electrolytic solution used may preferably be an oxalic acid aqueous solution. Using an oxalic acid aqueous solution enables to preferably form a hard porous alumina layer. A moth-eye mold which includes such a porous alumina layer exhibits high durability when used as a stamper. For example, the temperature of the oxalic acid aqueous solution is not less than 5° C. and not more than 30° C., and the concentration of the oxalic acid aqueous solution is not less than 0.1 mass % and not more than 2 mass %. If the concentration of the oxalic acid aqueous solution is lower than 0.1 mass %, the extending direction of the micropores would not be perpendicular to the substrate surface. If the concentration of the oxalic acid aqueous solution is higher than 2 mass %, the anodization would start before the forming voltage reaches a predetermined value, so that micropores of a desired shape sometimes cannot be formed.

The average thickness of the barrier layer 19b after the anodization is, for example, not less than 5 nm and not more than 250 nm. When the average thickness of the barrier layer 19b is not more than 250 nm, the average adjoining distance $D_{int}$ of the micropores 19p is not more than 500 nm. As a result, the reflectance of a moth-eye structure which is formed using a moth-eye mold 100 (see FIG. 1(e)) that is manufactured from the mold base 10 can be reduced. Further, it is difficult to uniformly form a barrier layer whose average thickness is less than 5 nm, and therefore, it is preferred that the average thickness of the barrier layer 19b is not less than 5 nm.

When necessary, the first-formed porous alumina layer 19 may be removed. The first-formed porous alumina layer 19 may sometimes contain many defects due to the effects of impurities and the like. The thickness of the porous alumina layer 19 that is formed first and then removed is preferably not less than 200 nm from the viewpoint of reproducibility and preferably not more than 2000 nm from the viewpoint of productivity. As a matter of course, when necessary, the first-formed porous alumina layer 19 may be removed partially (for example, from the surface to a certain depth). The removal of the porous alumina layer 19 may be realized by a known removing method, such as immersion in a phosphoric acid aqueous solution or a chromium-phosphoric acid mixture solution, for example, for a certain period of time.

Then, the porous alumina layer 19 that has the micropores 19p is brought into contact with an alumina etching solution such that a predetermined amount is etched away, whereby the pore diameter of the micropores 19p is increased as shown in FIG. 1(c). Here, wet etching may be employed, such that the micropores can be isotropically enlarged. By adjusting the type and concentration of the etching solution and the etching duration, the etching amount (i.e., the size and depth of the micropores 19p) can be controlled. The etching solution used may be, for example, an aqueous solution of 10 mass % phosphoric acid or organic acid, such as formic acid, acetic acid, citric acid, or the like, or a chromium-phosphoric acid mixture solution. Alternatively, the etching solution used may be, for example, an acidic aqueous solution of sulfuric acid, phosphoric acid, oxalic acid, or the like, or an alkaline aqueous solution of sodium hydroxide, or the like. For example, a phosphoric acid aqueous solution is preferably used as the etching solution. The phosphoric acid aqueous solution is less expensive and less hazardous as well as capable of relatively easily controlling the etching rate. For example, the temperature of the phosphoric acid aqueous solution is not less than 10° C. and not more than 50° C. The concentration of the phosphoric acid aqueous solution is not less than 0.1 M and not more than 10 M.

By performing the etching, the thickness of the barrier layer 19b is decreased. Note that, although details will be described later, according to the present embodiment, the etching is performed such that the average depth of the plurality of micropores (minute recessed portions) 19 increases but does not exceed a ⅓ of the average thickness of the barrier layer 19b before the etching. For example, when the average thickness of the barrier layer 19b before the etching is about 90 nm, the etching is performed such that the average depth of the micropores 19p increases but does not exceed 12 nm.

The anodization and the etching may be repeatedly performed.

For example, the aluminum film 18 is again partially anodized, whereby the thickness of the porous alumina layer 19 can be increased as shown in FIG. 1(d). In this process, the depth of the micropores 19p increases, and the thickness of the barrier layer 19b also increases. For example, by performing this anodization for a certain period of time, the thickness of the barrier layer 19b increases so as to be generally equal to what it has been after the first anodization cycle. Note that the growth of the micropores 19p starts at the bottoms of the previously-formed micropores 19p, and accordingly, the lateral surfaces of the micropores 19p have stepped shapes.

Thereafter, when necessary, the porous alumina layer 19 may be brought into contact with an alumina etching solution to be further etched such that the micropores 19p are further enlarged as shown in FIG. 1(e). The etching solution used in this step may preferably be the above-described etching solution. Practically, the same etching bath may be used. Note that, in this step, the etching is also performed such that the average depth of the micropores 19p increases but does not exceed a ⅓ of the average thickness of the barrier layer 19b before the etching.

Thus, by alternately repeating the anodization step (FIG. 1(b)) and the etching step (FIG. 1(c)) as described above, the porous alumina layer 19 with the micropores (minute recessed portions) 19p, which has a desired uneven pattern, can be obtained. By appropriately determining the conditions for each of the anodization steps and the etching steps, the pore formation density, the pore diameter, and the pore depth of the micropores 19p as well as the stepped shape of the lateral surface of the micropores 19p can be controlled. Further, the pore diameter of the micropores 19p may be increased such that adjacent ones of the micropores 19p are connected with each other. In that case, the average pore diameter $D_p$ of the micropores 19p is generally equal to the average adjoining distance $D_{int}$ of the micropores 19p. To decrease the bottom portion of the micropores 19p, the process is preferably ended with the anodization step (without performing any subsequent etching step). In a moth-eye structure which is formed using the obtained moth-eye mold 100, the raised portions can have small tips, so that the antireflection effects can be improved. It is preferred that, when the moth-eye mold 100 is viewed in a direction normal to the surface, the two-dimensional size of the plurality of minute recessed portions (micropores) 19p is not less than 10 nm and less than 500 nm, and the distance between the bottom points of adjacent ones of the micropores 19p is not less than 30 nm and less than 600 nm.

In the example described herein, the anodization step and the etching step are alternately performed. However, between the anodization step and the etching step, or between the etching step and the anodization step, a washing step and a drying step subsequent thereto may be performed. Also, in an interval between the anodization steps, the anodization conditions such as the forming voltage may be changed. Note that the buffer layer and the inorganic underlayer such as described above are disclosed in, for example, WO 2010/116728. In this specification, the disclosures of WO 2010/116728 are incorporated by reference.

Figure 2:
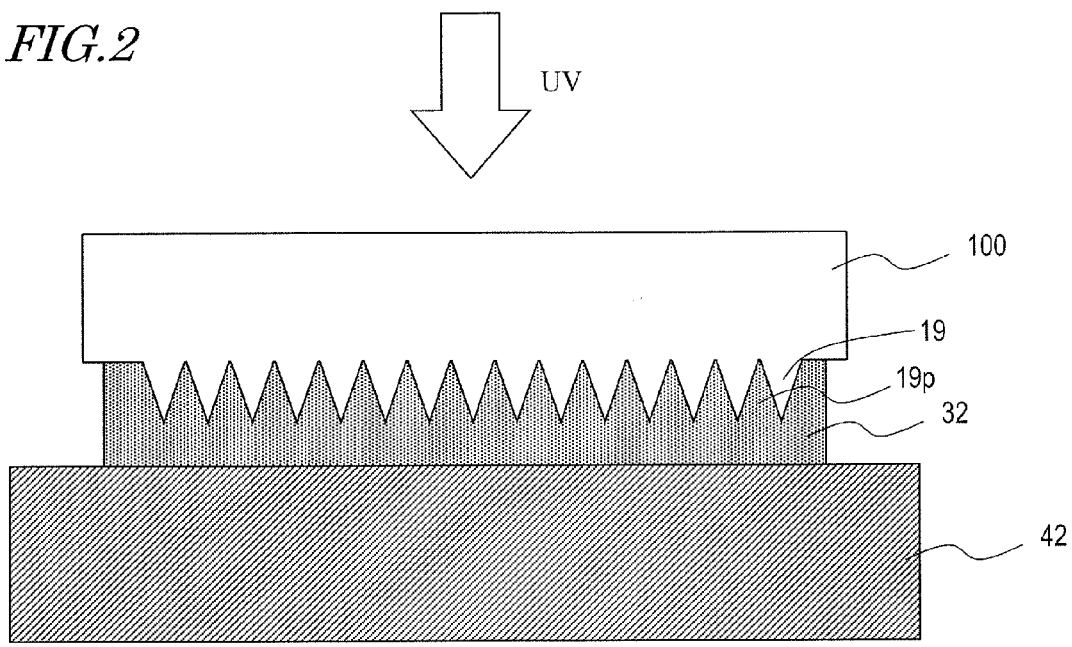
FIG. 2 A schematic diagram for illustrating production of an antireflection element with the use of a moth-eye mold of the present embodiment.

Next, an antireflection film production method with the use of the moth-eye mold 100 is described with reference to FIG. 2. Firstly, the moth-eye mold 100 is provided. The moth-eye mold 100 is manufactured as previously described with reference to FIG. 1.

Then, a UV-curable resin 32, which is provided between a surface of a work 42 and the mold 100, is irradiated with ultraviolet (UV) light via the mold 100 such that the UV-curable resin 32 is cured. The UV-curable resin 32 may be provided over the surface of the work 42 or may be provided over a mold surface of the mold 100 (a surface of the mold 100 which has the moth-eye structure). The UV-curable resin used may be, for example, an acrylic resin.

Thereafter, the moth-eye mold 100 is separated from the work 42, whereby a cured material layer of the UV-curable resin 32, to which the uneven structure of the moth-eye mold 100 is transferred, is formed over the surface of the work.

The raised portions of the moth-eye structure preferably have a base whose diameter is not less than 10 nm and not more than 500 nm. Further, when the raised portions have a conical shape, the antireflection effect can be improved. The raised portions are preferably arranged so as to have no periodicity for the purpose of preventing occurrence of unnecessary diffracted light. Here, "having no periodicity" means that, for example, the distance between the vertex of a certain one of a plurality of raised portions and the vertex of a raised portion which is closest to the vertex of the certain raised portion is different from the distance between the vertex of another certain one of the plurality of raised portions and the vertex of still another one of the raised portions which is closest to the vertex of the another certain raised portion. As for the meaning of "having no periodicity", for example, when the total sum of the vectors extending from the barycenter of a certain one of the micropores to the barycenters of all the micropores that are adjacent to the certain micropore is not less than 5% of the total length of the vectors, it can be said that the arrangement of the micropores has no periodicity.

To form the raised portions of an antireflection element so as to have a predetermined size, it is preferred to form the micropores (minute recessed portions) of the moth-eye mold 100 such that the depth and the pore diameter of the micropores correspond to the size of the raised portions. Specifically, formation of relatively tall raised portions in the antireflection element may be realized by forming deep micropores in the moth-eye mold 100. Note that, in that case, the anodization cycles and the etching cycles can be reduced by making the increase of the micropore depth which is achieved through a single etching cycle as great as possible.

In the moth-eye mold 100 of the present embodiment, the adhesive property between the base 12 and the aluminum layer 18 is improved by providing the inorganic underlayer 14 and the buffer layer 16 between the base 12 and the aluminum layer 18. However, the inventor of the present application conducted intensive researches and found that, when the anodization and the etching are performed after the inorganic underlayer and the buffer layer are provided, the adhesive property can deteriorate due to defects.

Figure 3:
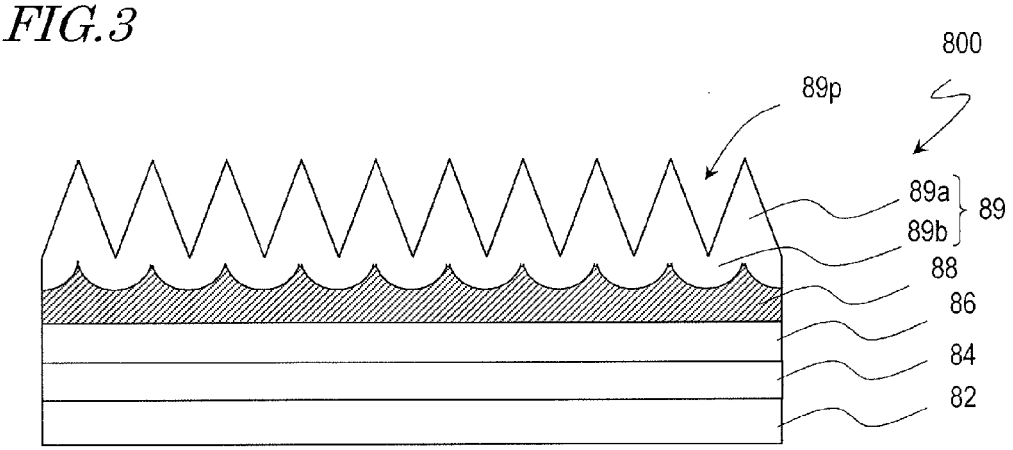
FIG. 3 A schematic diagram of a moth-eye mold of a comparative example.

Hereinafter, the moth-eye mold 100 of the present embodiment is compared with a moth-eye mold 800 of a comparative example, and the advantages of the moth-eye mold 100 are described. First, the moth-eye mold 800 is described with reference to FIG. 3. Note that the moth-eye mold 800 of the comparative example is manufactured using a mold base 80 that has the same configuration as that of the above-described mold base 10.

Here, the size of the mold base 80 is 1 m×1.6 m. Specifically, in the mold base 80, a base 82 is made of PET, an inorganic underlayer 84 used is a 70 nm thick silicon oxide layer (SiO$_2$), and a buffer layer 86 used is a 150 nm thick aluminum oxide layer. Note that the buffer layer 86 is formed by sputtering of aluminum in an oxygen atmosphere. In the mold base 80, an aluminum layer 88 has a thickness of 1000 nm.

Next, anodization of the mold base 80 is performed. This anodization is the same as the previously-described anodization that is to be performed on the mold base 10. For example, the anodization is performed with a forming voltage at 80 V using a 0.3 mass % oxalic acid aqueous solution at a solution temperature of 5° C. as the electrolytic solution. In this case, the thickness of a barrier layer 80b is about 90 nm.

Thereafter, etching of the mold base 80 is performed. Here, the etching is performed for 25 minutes using a 10 mass % (1.0 M) phosphoric acid aqueous solution at a solution temperature of 30° C. as the etching solution.

To form micropores which have a predetermined size, the anodization and the etching are repeated through a plurality of cycles. Specifically, the anodization is performed through 5 cycles, and the etching is performed through 4 cycles. As a result, the average adjoining distance, the average depth, and the average pore diameter of finally-formed micropores are 180 nm, 400 nm, and 180 nm, respectively. In this way, the moth-eye mold 800 is manufactured.

However, the moth-eye mold 800 that has such a configuration may lead to peeling off of the aluminum layer 88 from the base 82 in the process of manufacturing the moth-eye mold 800 or in the process of producing an antireflection element with the use of the moth-eye mold 800.

Figure 4:
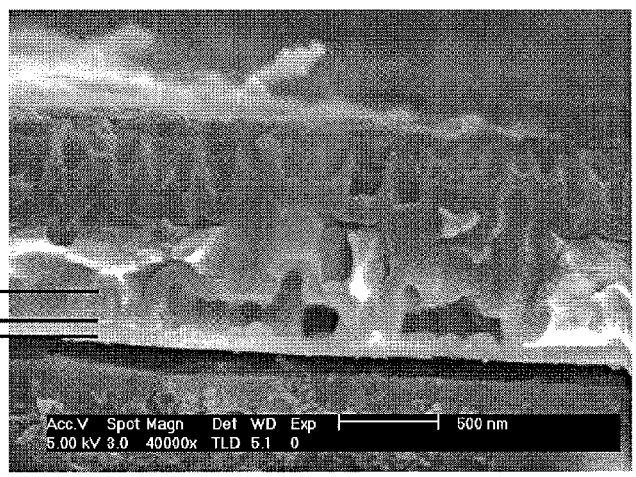
FIGS. 4 (a) and (b) are cross-sectional SEM images of a moth-eye mold of a comparative example.
Figure 4:
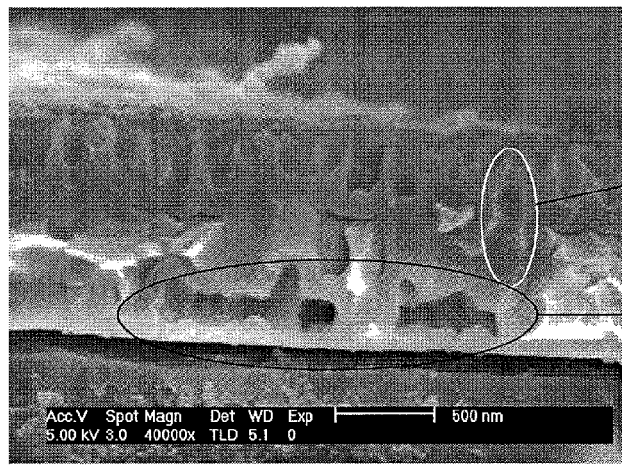

FIG. 4 shows cross-sectional SEM images of the moth-eye mold 800 of the comparative example. FIG. 4(a) is a cross-sectional SEM image of the moth-eye mold 800. The inorganic underlayer 84 and the buffer layer 86 are seen in FIG. 4(a). As appreciated from FIG. 4(a), the buffer layer 86 has a vacancy extending in a horizontal direction. It is inferred that, due to this vacancy, the adhesive property between the base 82 and the aluminum layer 88 deteriorated.

As seen from FIG. 4(b), upon close observation on the aluminum layer 88 in this SEM image, the aluminum layer also has a vacancy, and this vacancy connects with the vacancy of the buffer layer 86. It is inferred from this observation that a treatment solution permeated the buffer layer 86 via the vacancy of the aluminum layer 88 and dissolved the buffer layer 86. It is also inferred that, due to the presence of the vacancies connected between the aluminum layer 88 and the buffer layer 86, using the moth-eye mold 800 leads to a failure to form a predetermined moth-eye structure.

In general, by the anodization, a porous alumina layer which has micropores is formed in the surface of the aluminum layer, and a barrier layer is formed at the bottom of the micropores. Since the barrier layer has relatively high physical and chemical tolerance, it is not probable that using the electrolytic solution and the etching solution in the anodization step and the etching step leads to dissolution of the buffer layer that is provided under the aluminum layer. However, as seen from FIG. 4(a) and FIG. 4(b), the buffer layer 86 was dissolved in the moth-eye mold 800. The present inventor measured the buffer layer 86 before formation of the aluminum layer 88 using a Scanning Electron Microscope (SEM). The buffer layer 86 was formed by sputtering in an oxygen atmosphere and therefore had a relatively large vacancy between crystal grains, although it was not so large as the vacancies shown in FIG. 4(a) and FIG. 4(b). The results of the SEM measurement of the surface of the mold base 80 (i.e., the aluminum layer 88) are described below.

Figure 5:
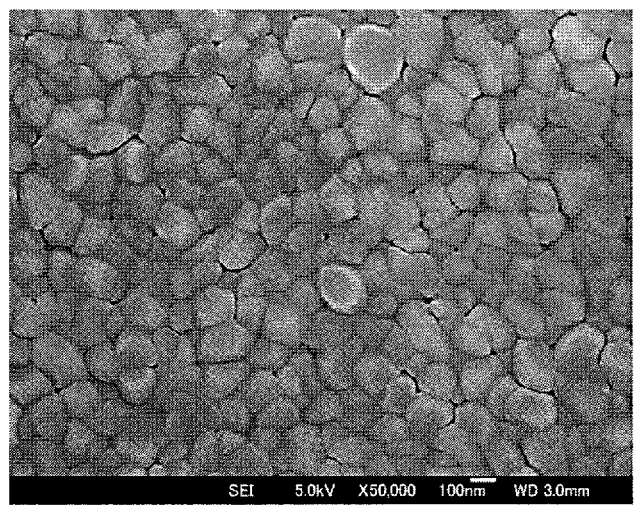
FIGS. 5 (a) and (b) are SEM images of the surface of a moth-eye mold of a comparative example. (c) is a schematic cross-sectional view showing aluminum crystals and vacancies in an aluminum layer.
Figure 5:
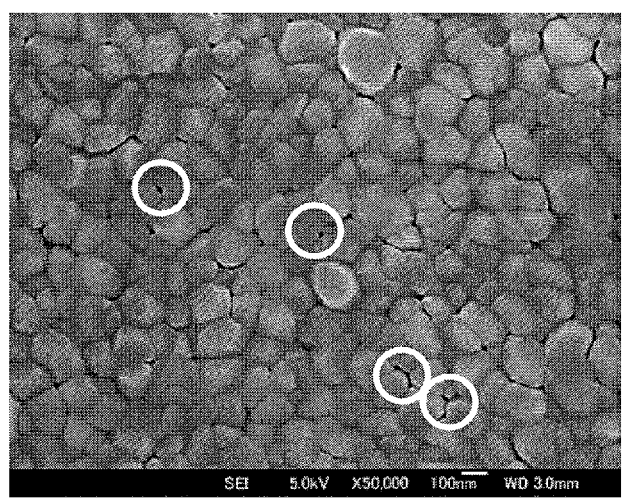
Figure 5:
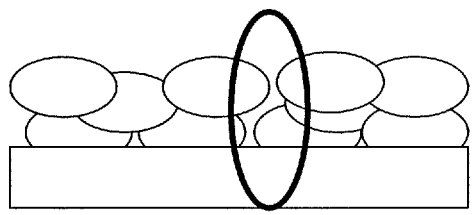

FIG. 5(a) is a SEM image of the surface of the mold base 80. In FIG. 5(b), vacancies seen in the SEM image of FIG. 5(a) are marked. Note that FIG. 5(a) and FIG. 5(b) are SEM images of the surface of the mold base 80 before the anodization.

As seen from FIG. 5(a) and FIG. 5(b), in the mold base 80, the aluminum layer 88 that is provided on the buffer layer 86 includes minute crystal grains of aluminum. In general, aluminum has a tendency that the size of crystal grains decreases as the purity increases. When an aluminum layer 88 which has a relatively-large thickness (here, 1 μm) is formed by sputtering, a relatively-large vacancy is formed between crystal grains of aluminum. Note that, in general, the diameter of this vacancy is not more than 60 nm. Note that, strictly speaking, this vacancy can be reduced by performing formation of the aluminum layer 88 for a relatively-long period of time, although the cost increases in this case.

When the aluminum layer 88 of high purity is formed as described above, vacancies are produced between crystal grains of aluminum. The number and size of the vacancies increase particularly when the aluminum layer 88 is formed on a surface which is made of the organic insulating material of the base. Although the cause of this fact is not cleared up, it may be attributed to the fact that the crystal grains of aluminum are likely to undergo grain growth due to the heat produced in formation of the aluminum layer 88 and the fact that the vacancies expand due to a gas produced from the organic insulating material.

FIG. 5(c) is a schematic cross-sectional view showing aluminum crystals and a vacancy in the aluminum layer 88. In FIG. 5(c), the vacancy in the aluminum layer 88 is also marked. Note that, although it has previously been explained that FIG. 5(a) to FIG. 5(c) show the surface of the aluminum layer 88 of the mold base 80 that is used in manufacture of the moth-eye mold 800 of the comparative example, the mold base 10 that is used in manufacture of the moth-eye mold 100 of the present embodiment is formed in the same way as the mold base 80 and, in the mold base 10, the surface of the aluminum layer 18 has vacancies likewise.

The present inventor concluded that, due to the vacancies produced in the aluminum layer 88 as described above, the etching solution permeated the buffer layer via the vacancies of the aluminum layer in the etching and dissolved the buffer layer. To ascertain this mechanism, the mold base 80 was immersed in the etching solution, without performing the anodization. The results of this test are shown below.

FIG. 6(a), FIG. 6(b), FIG. 7(a), and FIG. 7(b) are SEM images of the mold base 80 immersed in a phosphoric acid aqueous solution, without performing the anodization. FIG. 6(a) is a SEM image of a surface of the mold base 80 that was immersed in a phosphoric acid aqueous solution for 50 minutes. FIG. 6(b) is an enlarged view of FIG. 6(a). FIG. 7(a) is a SEM image of a surface of the mold base 80 that was immersed in a phosphoric acid aqueous solution for 100 minutes. FIG. 7(b) is an enlarged view of FIG. 7(a). Note that the mold base 80 was immersed in a phosphoric acid aqueous solution without interruption for 50 minutes and for 100 minutes. The size of the mold base 80 was 1 m×1.6 m.

As described above, the mold base 80 is made of the same materials as the mold base 10. Specifically, in the mold base 80, the base 82 is made of PET, the inorganic underlayer 84 is a 70 nm thick silicon oxide layer (SiO$_2$), and the buffer layer 86 is a 150 nm thick aluminum oxide layer. Note that the aluminum oxide layer is formed by sputtering of aluminum in an oxygen atmosphere. In this mold base 80, the thickness of the aluminum layer 88 is 1000 nm. Here, the etching solution used is a phosphoric acid aqueous solution.

Figure 6:
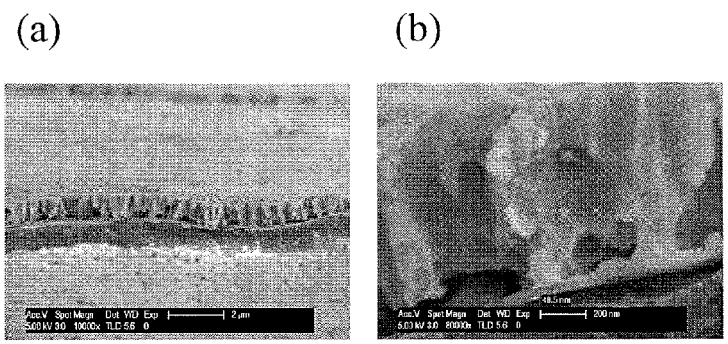
FIGS. 6 (a) and (b) are cross-sectional SEM images of a mold base immersed in a phosphoric acid aqueous solution for 50 minutes.
Figure 7:
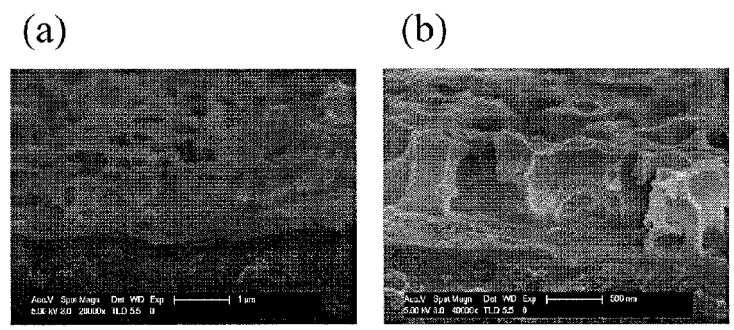
FIGS. 7 (a) and (b) are cross-sectional SEM images of a mold base immersed in a phosphoric acid aqueous solution for 100 minutes.

As appreciated from FIG. 6 and FIG. 7, there are vacancies extending to an inner part at a depth of several hundreds of nanometers from the surface (i.e., the buffer layer). This is probably because a phosphoric acid aqueous solution that permeated the buffer layer via the vacancies of the aluminum layer dissolved part of the buffer layer (here, aluminum oxide layer), and a phosphoric acid aqueous solution that entered vacancies which were present in the buffer layer dissolved part of the buffer layer. Note that, herein, the mold base 80 was not anodized, and therefore, a barrier layer was not formed at the surface of the aluminum layer. Thus, immersion of the mold base 80 in a phosphoric acid aqueous solution led to formation of a plurality of voids in the aluminum layer.

As appreciated from FIG. 6 and FIG. 7, there are a plurality of voids of the aluminum layer in the surface, which have a diameter of about several hundreds of nanometers. It is inferred that some of the voids were attributed to dissolution of the aluminum layer, and others were attributed to peeling off of the aluminum layer overlying the aluminum oxide layer due to dissolution of the aluminum oxide layer underlying the aluminum layer. It is thus inferred that dissolution of the buffer layer in the etching solution affects the adhesion of the aluminum layer.

In the above-described example, the buffer layer used is an aluminum oxide layer, and the etching solution used is a phosphoric acid aqueous solution. Dissolution of the buffer layer by the etching solution can also occur with any other combination. The dissolution also occurs likewise when the buffer layer used is, for example, an aluminum oxide layer, a titanium oxide layer, or a titanium nitride layer. Also, the dissolution occurs likewise when the etching solution used is an acidic aqueous solution of sulfuric acid, phosphoric acid, oxalic acid, or the like, or an alkaline aqueous solution of sodium hydroxide, or the like.

When the inorganic underlayer used is a silicon oxide layer ($SiO_2$) as described above, the buffer layer that is provided between the inorganic underlayer and the aluminum layer preferably has a configuration which is similar to both the inorganic underlayer and the aluminum layer. The buffer layer used is preferably an aluminum oxide layer. However, the aluminum oxide layer can be very readily dissolved in a phosphoric acid aqueous solution.

Figure 8:
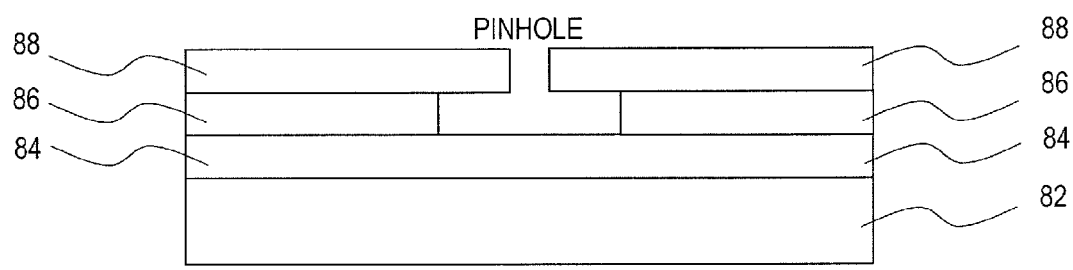
FIG. 8 A schematic diagram showing dissolution of a buffer layer in a mold base.

Here, dissolution of the buffer layer 86 of the mold base 80 is described with reference to FIG. 8. FIG. 8 is a schematic diagram of the mold base 80. The etching solution permeating the buffer layer 86 via a vacancy of the aluminum layer 88 dissolves the buffer layer 86, so that a vacancy corresponding to the vacancy of the aluminum layer 88 is formed in the buffer layer 86. Note that, when the buffer layer 86 is formed by sputtering, the buffer layer 86 has a relatively-large number of vacancies. Therefore, even before the etching step, the vacancies of the aluminum layer 88 are connected with some of the vacancies of the buffer layer 86. In this case also, it is inferred that the etching solution permeating the buffer layer 86 dissolves the buffer layer 86. Such dissolution of the buffer layer 86 causes defects, so that the adhesive property deteriorates. Note that a vacancy extending across different layers, such as shown in FIG. 8, is also referred to as "pinhole".

As described above, it is inferred that entry of the etching solution into the vacancies between the crystal grains of aluminum causes dissolution of the buffer layer. Note that, herein, the mold base 80 was immersed in the etching solution without performing the anodization for the sake of confirmation, although the mold base 80 is originally supposed to undergo the etching after the anodization.

Figure 9:
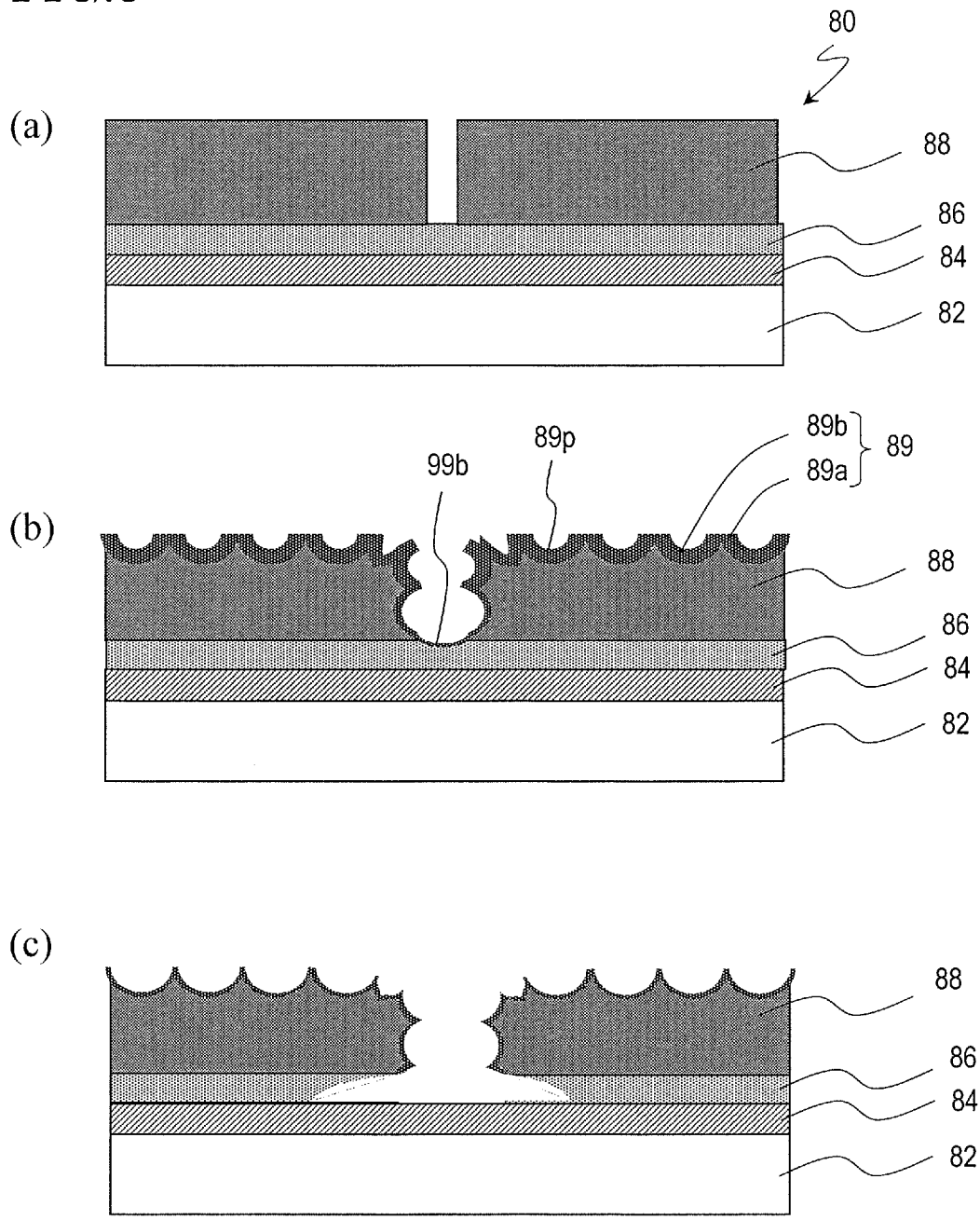
FIG. 9 (a) to (c) are schematic diagrams showing a vacancy produced in an aluminum layer of a moth-eye mold.

Hereinafter, the mechanism of dissolution of the buffer layer in manufacture of the moth-eye mold 800 of the comparative example is described with reference to FIG. 9. FIG. 9(*a*) shows the mold base 80 before the anodization. The aluminum layer 88 has a vacancy between crystal grains of aluminum. Note that, in actuality, the vacancy is a gap between adjacent crystal grains. The actual vacancy has a complicated shape, although the vacancy shown in FIG. 9(*a*) has a simple linear shape.

Then, the anodization is performed. The anodization is realized by immersing the mold base 80 in the electrolytic solution. By the anodization, minute recessed portions (micropores) 89*p* and a barrier layer 89*b* lying at the bottom of the micropores 89*p* are formed as shown in FIG. 9(*b*).

As described above, the aluminum layer 88 has a vacancy, and in the anodization, the electrolytic solution enters the vacancy of the aluminum layer 88. Therefore, oxidation also advances at the bottom of the vacancy so that the bottom of the vacancy is coated. Although not shown herein, when the vacancy of the buffer layer 86 is connected with the vacancy of the aluminum layer 88, the electrolytic solution also enters the vacancy of the buffer layer 86. In this case, it is inferred that, oxidation advances in a portion surrounding the vacancy of the buffer layer, so that the portion surrounding the vacancy is also coated. It is inferred that, particularly when the buffer layer 86 contains an aluminum constituent, for example, when the buffer layer 86 is an aluminum oxide layer which is formed by sputtering of an aluminum target in an oxygen atmosphere, the electrolytic solution permeating the aluminum oxide layer via the vacancy of the aluminum layer 88 in the anodization causes advancement of a reaction which is similar to the anodization at the surface of the aluminum oxide layer or aluminum oxide crystals. In this specification, a layer which is formed at the bottom of the vacancy in the aluminum layer or in a portion surrounding the vacancy of the buffer layer 86 is also referred to as "covering portion".

This covering portion 99*b* has relatively high physical and chemical tolerance as does the barrier layer 89*b* that is formed at the bottom of the normal micropores (minute recessed portions) 89*p*. However, it is inferred that the thickness of the covering portion 99*b* is smaller than that of the barrier layer 89*b*. This is because the covering portion 99*b* is formed at a position which is distant from the surface of the porous alumina layer 89 and which is surrounded by crystal grains of aluminum and aluminum oxide so that the electrolytic solution is unlikely to be refreshed, whereas the barrier layer 89*b* is formed at a position which is relatively close to the surface of the aluminum layer 88 so that the electrolytic solution can be sufficiently refreshed. It is also inferred that as the place where the covering portion 99*b* is formed is closer to the base 82, the thickness of the covering portion 99*b* decreases.

Thereafter, the etching is performed using the etching solution. In this case, in the porous alumina layer 89, the pore diameter of the normal micropores (minute recessed portions) 89*p* increases as shown in FIG. 9(*c*). Note that the etching solution also enters the vacancy of the aluminum layer 88. As described above, the thickness of the covering portion 99*b* that is formed in the vicinity of the buffer layer 86 or formed in the buffer layer 86 is particularly small, and therefore, the covering portion 99*b* is dissolved even when the etching is performed such that the barrier layer 89*b* is not dissolved. As a result, the etching solution permeates the buffer layer 86 and dissolves the buffer layer 86.

The etching rate for the buffer layer 86 is much higher than that for the porous alumina layer 89. The etching rate for the porous alumina layer 89 is higher than the etching rate for the lateral surface portion of the vacancy of the aluminum layer 88. This is because the etching solution is unlikely to be refreshed as is the electrolytic solution that is used in the anodization.

The above relationship can be expressed as follows:

Buffer Layer>>Surface of Porous Alumina Layer>Lateral Surface of Vacancy of Aluminum Layer It is inferred from the above knowledge that decreasing the number of vacancies in the aluminum layer enables to prevent dissolution of the buffer layer and, as a result, enables to prevent deterioration of the adhesive property. For example, by forming an aluminum layer with a predetermined thickness by sputtering through a plurality of separate cycles, the number of vacancies in the aluminum layer can be reduced. Therefore, permeation of the etching solution is prevented, and as a result, deterioration of the adhesive property can be prevented. However, when the sputtering is performed through a plurality of cycles in this way, a long period of time is required for the formation of the aluminum layer, and accordingly, the cost increases.

The inventor of the present application found that dissolution of the buffer layer can be prevented by performing the etching such that the increase of the average depth of the micropores (minute recessed portions) which is achieved by the etching is not relatively large as compared with the average thickness of the barrier layer before the etching. By making the increase of the average depth of the micropores (minute recessed portions) which is achieved through a single etching cycle smaller than a predetermined proportion of the average thickness of the barrier layer before the etching, dissolution of the covering portion can be prevented. As a result, the deterioration of the adhesive property can be prevented. However, as described above, when the increase of the depth of the micropores which is achieved through a single etching cycle is excessively small, the number of cycles of the anodization step and the number of cycles of the etching step which are necessary for formation of micropores with a predetermined depth and a predetermined pore diameter increase. Therefore, from the viewpoint of cost, it is preferred that the increase of the average depth of the micropores which is achieved through a single etching cycle is as large as possible within a predetermined range.

The micropores are isotropically enlarged by the etching. Therefore, the increase of the pore diameter of the micropores is generally twice the increase of the depth of the micropores. Thus, the depth of the micropores which is achieved through a single etching cycle can be determined from the increase of the average pore diameter of the micropores. For example, the increase of the average depth of the minute recessed portions (micropores) which is achieved by the etching may be determined as described below.

Figure 10:
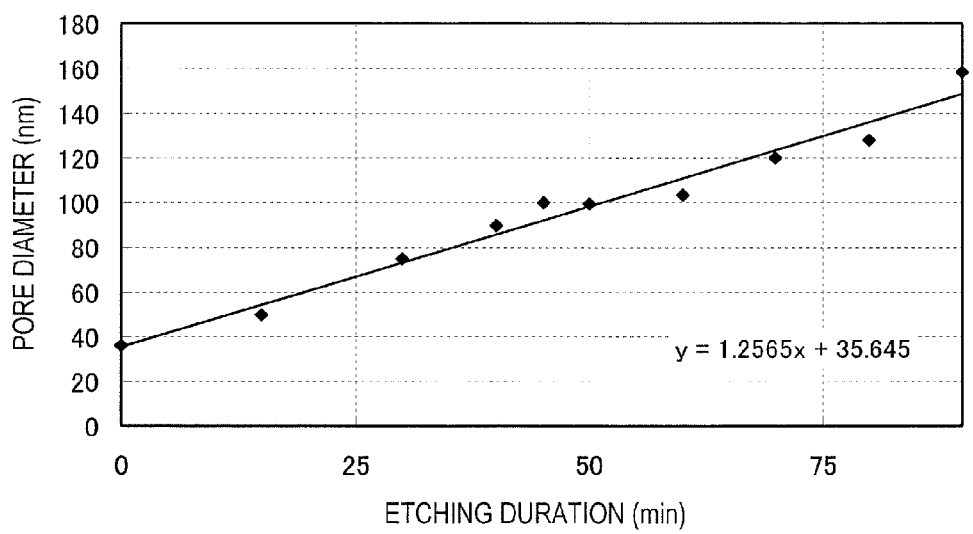
FIG. 10 A graph showing the variation of the pore diameter over the etching duration.

FIG. 10 is a graph which shows the pore diameter of the micropores with respect to the etching duration. Here, the graph shows the variation of the pore diameter of the micropores with respect to varying durations of the etching that is performed after the anodization has been performed with the forming voltage of 80 V using a 0.3 mass % oxalic acid aqueous solution at the solution temperature of 5° C. Note that, herein, the average thickness of the barrier layer after the anodization is 90±5 nm.

As the etching duration increases, the pore diameter of the micropores also increases. The pore diameter of the micropores, y, and the etching duration, t, have the relationship of y=1.25t+35.6. The increase rate of the pore diameter of the micropores is 1.25. Note that the intercept (35.6) means the pore diameter of the micropores that are formed by the anodization before the start of the etching.

The micropores formed by the anodization are isotropically enlarged by the etching. Therefore, the increase of the depth of the micropores (i.e., the decrease of the barrier layer) is half the increase of the pore diameter of the micropores. Thus, herein, the etching rate for the barrier layer is 0.628. Specifically, the etching rate for the barrier layer may be expressed as 0.628±0.1 nm/min.

Thus, for example, when the etching is performed for 25 minutes, the increase of the depth of the micropores is 15.7±2.5 nm. When the etching is performed for 16 minutes and 40 seconds, the increase of the depth of the micropores is 10.5±1.5 nm. When the etching is performed for 10 minutes, the increase of the depth of the micropores is 6.3±1.0 nm. In this way, the increase of the depth of the micropores which is achieved by the etching can be determined from the etching rate and the etching duration for the pore diameter.

Hereinafter, the adhesion of the moth-eye molds 100a, 100b, and 800a, among which the increase of the average depth of the micropores is different as described above, is described. Firstly, mold bases 10a, 10b, and 80a are provided. The mold bases 10a, 10b, and 80a each have a size of 1 m×1.6 m. The mold bases 10a, 10b, and 80a are composed of the same materials. Specifically, in the mold bases 10a, 10b, and 80a, the bases are made of PET. The inorganic underlayer used is a 70 nm thick silicon oxide layer ($SiO_2$). The buffer layer used is a 150 nm thick aluminum oxide layer. Note that the aluminum oxide layer is formed by sputtering of aluminum in an oxygen atmosphere. The thickness of the aluminum layer is 1000 nm.

Anodization is performed on the mold bases 10a, 10b, and 80a. By the anodization, a porous alumina layer is formed over the surface of the aluminum layer of each of the mold bases 10a, 10b, and 80a. Specifically, the anodization is performed with an applied voltage of 80 V using an oxalic acid aqueous solution (concentration: 0.3 mass %, solution temperature: 18° C.). In this case, the average thickness of the barrier layer is about 90 nm. Note that, however, even when it is attempted to perform the anodization such that the average thickness is 90 nm, strictly speaking, the average thickness of the barrier layer varies by about 5 nm. Thus, the average thickness of the barrier layer is not less than 85 nm and not more than 95 nm.

Then, etching is performed. The etching is performed using a phosphoric acid aqueous solution (concentration: 1 M, solution temperature: 30° C.). Note that, herein, for the mold bases 80a, 10a, and 10b, the increases of the average depth of the micropores are 15.7±2.5 nm, 10.5±1.5 nm, and 6.3±1.0 nm, respectively. Specifically, for the mold base 80a, the etching is performed such that the average depth of the micropores increases and exceeds a 1/7 of the average thickness of the barrier layer before the etching. For the mold bases 10a and 10b, the etching is performed such that the average depth of the micropores increases but does not exceed a 1/7 of the average thickness of the barrier layer before the etching.

Thereafter, the anodization and the etching are repeated. Both the anodization and the etching are performed under the conditions that have previously been described. Note that, for either of the mold bases 10a, 10b, and 80a, the process is ended with the anodization step that is performed after the final etching cycle has been finished.

Among the mold bases 10a, 10b, and 80a, the total duration of the anodization that is performed through a plurality of cycles and the total number of etching cycles are equal in order that the final size of the micropores (minute recessed portions) is equal among the mold bases 10a, 10b, and 80a.

The total anodization duration is about 275 seconds. The total etching duration is about 100 minutes.

Specifically, for the mold base 80a, the anodization is performed through 5 cycles, the etching is performed through 4 cycles, the duration of a single anodization cycle is 55 seconds, and the duration of a single etching cycle is 25 minutes. For the mold base 10a, the anodization is performed through 7 cycles, the etching is performed through 6 cycles, the duration of a single anodization cycle is 39 seconds, and the duration of a single etching cycle is 16 minutes and 40 seconds. For the mold base 10b, the anodization is performed through 11 cycles, the etching is performed through 10 cycles, the duration of a single anodization cycle is 25 seconds, and the duration of a single etching cycle is 10 minutes.

Since the total duration of the anodization that is performed through a plurality of cycles and the total number of etching cycles are equal among the mold bases 10a, 10b, and 80a as described above, the final shape of the micropores (minute recessed portions) is generally equal among the obtained moth-eye molds 100a, 100b, and 800a. Specifically, the average adjoining distance, the average depth, and the average pore diameter of the micropores are 180 nm, 400 nm, and 180 nm, respectively. The results of peeling tests that were carried out on the obtained moth-eye molds 100a, 100b, and 800a are shown in Table 1.

TABLE 1

|  | Mold 800a | Mold 100a | Mold 100b |
|---|---|---|---|
| Number of anodization cycles/Anodization duration | 5 cycles/ 55 sec | 7 cycles/ 39 sec | 11 cycles/ 25 sec |
| Number of etching cycles/Etching duration | 4 cycles/ 25 min | 6 cycles/ 16 min 40 sec | 10 cycles/ 10 sec |
| Increase of depth of micropores (nm) | 15.7 ± 2.5 | 10.5 ± 1.5 | 6.3 ± 1.0 |
| First peeling test (w/crosscut) | X | Δ | Δ |
| Second peeling test (w/o crosscut) | 25 | 18 | 17 |

In the first peeling test, in the molds 800a, 100a, and 100b, an adhesive tape (Kapton tape manufactured by Permacel) was tightly placed onto the aluminum layer and then peeled off from the aluminum layer. The aluminum layer which was removed together with the peeled adhesive tape was checked with a human eye. In Table 1, "X" means that the aluminum layer was entirely removed from the region on which the adhesive tape was tightly placed, and "Δ" means that the aluminum layer was partially removed from the region on which the adhesive tape was tightly placed. In the moth-eye mold 800a, the aluminum layer 88 was entirely removed. In the moth-eye molds 100a and 100b, only a part of the aluminum layer 18 was removed.

In the second peeling test, in the molds 800a, 100a, and 100b, the aluminum layer was cut into a matrix of 5×5 squares, each having a size of 1 cm×1 cm, using a utility knife, with the incision reaching the surface of the base. An adhesive tape (Kapton tape manufactured by Permacel) was tightly placed onto the aluminum layer so as to cover a region of the cut squares and then peeled off from the aluminum layer. The number of squares which were removed together with the peeled adhesive tape was counted. In the moth-eye mold 800a, all the 25 squares were removed, whereas in the moth-eye molds 100a and 100b, some of the squares were not removed.

As described above, in the molds 100a and 100b, the inorganic underlayer 14 used was a 70 nm thick silicon oxide layer ($SiO_2$), and the buffer layer 16 used was a 150 nm thick aluminum oxide layer. However, it is inferred that, for example, even when the same materials are used, both the results of the first peeling test and the results of the second peeling test can be improved by increasing the thickness of the inorganic underlayer 14 and the thickness of the buffer layer 16.

Figure 11:
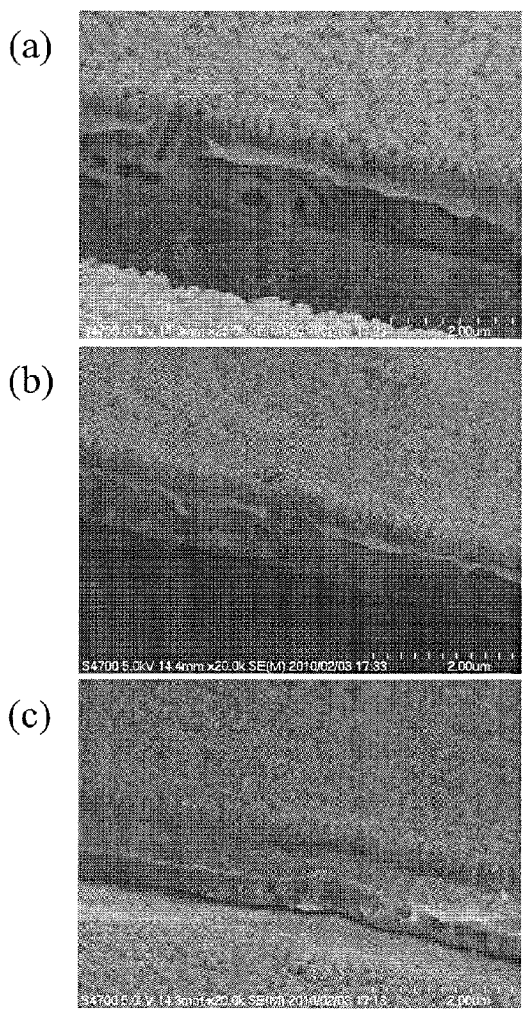
FIG. 11 (a) to (c) are bird's-eye view SEM images of cross-sections of moth-eye molds among which the increase of the average depth of micropores which was achieved by etching was different.

Now, the moth-eye molds 100a, 100b, and 800a are described with reference to FIG. 11.

FIG. 11(a), FIG. 11(b), and FIG. 11(c) are bird's-eye view SEM images of cross sections of the moth-eye molds 800a, 100a, and 100b, respectively. Note that, as described above, the average thickness of the barrier layer 19b, 89b that is formed after the anodization in the moth-eye molds 100a, 100b, and 800a is about 90 nm. However, in the etching steps for manufacture of the moth-eye molds 800a, 100a, and 100b, the etching durations are 25 minutes, 16 minutes and 40 seconds, and 10 minutes, respectively, and the increases of the average depth of the micropores are 15.7±2.5 nm, 10.5±1.5 nm, and 6.3±1.0 nm, respectively.

In the moth-eye mold 800a, the increase of the depth of the micropores 89p which is achieved by the etching is 15.7±2.5 nm, and therefore, the barrier layer 89b that is formed at the bottom of the micropores 89p in the porous alumina layer 89 is not dissolved. However, in the moth-eye mold 800a, the buffer layer 86 is dissolved. This is probably because the etching was performed in such a manner that the increase of the depth of the micropores 89p was large, so that the covering portion 99b that was formed at the bottom of the vacancies of the aluminum layer in the anodization (see FIG. 9) was dissolved by the etching solution, and the etching solution permeated the buffer layer 86. FIG. 11(a) is a SEM image of the moth-eye mold 800a.

On the other hand, in the moth-eye mold 100a, the increase of the average depth of the micropores 19p which is achieved by the etching is 10.5±1.5 nm, and therefore, the barrier layer 19b that is formed at the bottom of the micropores 19p in the porous alumina layer 19 is not dissolved, and dissolution of the buffer layer 16 is prevented. This is probably because the increase of the depth of the micropores 19p which was achieved by the etching was small, so that the covering portion that was formed at the bottom of the vacancies of the aluminum layer in the anodization was not dissolved by the etching solution. FIG. 11(b) is a SEM image of the moth-eye mold 100a.

In the moth-eye mold 100b, the increase of the average depth of the micropores 19p which is achieved by the etching is 6.3±1.0 nm, and therefore, the barrier layer 19b that is formed at the bottom of the micropores 19p in the porous alumina layer 19 is not dissolved, and dissolution of the buffer layer 16 is prevented. FIG. 11(c) is a SEM image of the moth-eye mold 100b.

Thus, when the average thickness of the barrier layer that is formed by the anodization is about 90 nm, if the average increase of the depth of the micropores which is achieved by the etching exceeds 12 nm, the buffer layer is dissolved, and as a result, the adhesive property deteriorates. On the other hand, if the average increase of the depth of the micropores which is achieved by the etching is not more than 12 nm, deterioration of the adhesive property can be prevented.

If the increase of the depth of the micropores which is achieved through a single etching cycle is smaller than 5 nm, this situation is not preferred because this small increase is included in the error of the barrier layer (a variation in thickness). If the increase of the depth of the micropores is smaller than the error of the barrier layer, the micropores are not substantially enlarged even when the etching step is performed due to the error of the barrier layer which is caused in the next anodization cycle. As a result, even when the anodization step and the etching step are repeated, the micropores which have a predetermined shape cannot be formed. Thus, it is preferred that the average increase of the depth of the micropores is not less than 5 nm and not more than 12 nm. Note that, for example, the average increase of the depth of the micropores can be adjusted to 5 nm by performing the etching for 7 to 9 minutes in a 1 M phosphoric acid solution at the solution temperature of 30° C.

As seen from the above results, dissolution of the buffer layer would not occur so long as the etching is performed such that the increase of the depth of the micropores which is achieved by the etching does not exceed a ⅐ of the thickness of the barrier layer before the etching. Further, for example, when the average thickness of the barrier layer is not less than 85 nm and not more than 95 nm, it is preferred that the average increase of the depth of the micropores which is achieved by the etching is not less than 5 nm and not more than 12 nm.

Dissolution of the buffer layer 86 matters particularly when the thickness of the barrier layer 89b is not more than 180 nm. The reasons for this will be discussed below.

Figure 12:
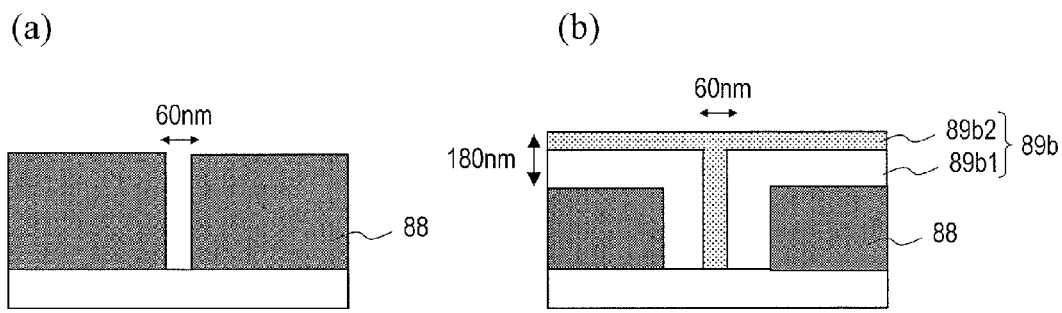
FIGS. 12 (a) and (b) are schematic diagrams for illustrating a change which is caused by anodization of an aluminum layer.

FIG. 12(*a*) shows a state of the aluminum layer 88 before the anodization. Here, a vacancy of the aluminum layer 88 shown in FIG. 12(*a*) has a linear shape as in FIG. 9(*a*). Note that, as previously described with reference to FIG. 5(*a*) and FIG. 5(*b*), the diameter of the vacancy is not more than 60 nm. Here, the diameter of the vacancy is 60 nm.

FIG. 12(*b*) shows the aluminum layer 88 and the porous alumina layer 89 which are in the process of the anodization. By the anodization, a surface portion of the aluminum layer 88 is changed into the porous alumina layer 89. In this process, the volume of the porous alumina layer 89 expands. In the anodization step, a barrier layer 89b is formed in advance, and thereafter, a porous layer 89a (FIG. 3) is formed at the surface of the barrier layer 89b, although only the barrier layer 89b is shown herein. As appreciated from the comparison between FIG. 12(*a*) and FIG. 12(*b*), the barrier layer 89b includes a first layer 89b1 which corresponds to a portion that is originally part of the aluminum layer 88 and a second layer 89b2 which corresponds to a portion that is increased by volume expansion. When the diameter of the vacancy of the aluminum layer 88 before the anodization increases by about 30 nm from the lateral surface toward the center of the vacancy, i.e., when the thickness of the second layer 89b2 is 30 nm, the 60 nm vacancy of the aluminum layer 88 is filled up. Since the volume expansion rate of the porous alumina layer 89 is about 1.2 times, the vacancy of the aluminum layer 88 is substantially filled up when the anodization is performed such that the thickness of the barrier layer 89b exceeds 180 nm. It can be said from this that, when the thickness of the barrier layer 89b exceeds 180 nm, dissolution of the buffer layer 86 is relatively unlikely to occur. On the other hand, when the thickness of the barrier layer 89b is not more than 180 nm, the vacancy also remains in the porous alumina layer 89, and therefore, it is inferred that the buffer layer 86 is likely to be dissolved. Further, as described above (especially when an oxalic acid aqueous solution is used), it is difficult to uniformly form a barrier layer whose average thickness is less than 5 nm. Thus, in the present embodiment, when the average thickness of the barrier layer is not less than 5 nm and not more than 180 nm, it is preferred that, as described above, the etching is performed such that the increase of the depth of the micropores which is achieved by the etching does not exceed a ⅐ of the thickness of the barrier layer before the etching.

Here, the forming voltage is 80 V, the average thickness of the barrier layer is 90 nm, and it is inferred from the above-described measurement results that the thickness of the covering portion is about 12 nm. It is inferred that, if the forming voltage is increased twofold, not only the thickness of the barrier layer but also the thickness of the covering portion are increased twofold. Thus, the thickness of the covering portion changes generally proportionally to the thickness of the barrier layer (i.e., the forming voltage). Therefore, it is inferred that, when the average thickness of the barrier layer is not less than 5 nm and not more than 250 nm, dissolution of the buffer layer can be prevented as described above by performing the etching such that the increase of the depth of the micropores which is achieved by the etching does not exceed a ⅐ of the thickness of the barrier layer before the etching.

In the description provided above, the increase of the average depth of the micropores which is achieved by the etching is determined from the relationship between the etching duration and the pore diameter, but the present invention is not limited to this example. The increase of the average depth of the micropores (minute recessed portions) may be measured from a cross-sectional SEM image.

In general, the adhesion of the aluminum layer in the case where the organic insulating material which is present at the surface of the base is PET is not so high as compared with a case where it is any other organic insulating material. However, deterioration of the adhesive property can further be prevented not only by providing the inorganic underlayer 14 and the buffer layer 16 but also by performing the etching such that the increase of the depth of the micropores which is achieved by the etching does not exceed a ⅐ of the average thickness of the barrier layer before the etching. Further, to form micropores which have a predetermined shape, in the case where the total etching duration is determined in advance, it is only necessary to increase the number of etching cycles (and accordingly the number of anodization cycles). Therefore, increase in cost can readily be prevented.

In the description provided above, the base is made of PET, but the present invention is not limited to this example. The base may be made of TAC. Alternatively, the base may have an organic insulating layer which is formed of an electrodeposition material or a spray painting material on the support. However, the crystal state inside the aluminum layer varies depending on the organic insulating material that forms the surface of the base.

Hereinafter, the adhesion of moth-eye molds 100c, 100d, and 800b that include a base in which an organic insulating layer is provided on a support is described. Note that, herein, the organic insulating layer is formed of acrylic melamine by means of electrodeposition. Among the moth-eye molds 100c, 100d, and 800b, the increase of the average depth of the micropores which is achieved by the etching is different.

Firstly, mold bases 10c, 10d, and 80b are provided. The mold bases 10c, 10d, and 80b each have a size of 5 cm×7 cm. The mold bases 10c, 10d, and 80b are composed of the same materials. Specifically, the mold bases 10c, 10d, and 80b include an organic insulating layer which is made of acrylic melamine. This organic insulating layer undergoes plasma aching. The inorganic underlayer used is a 100 nm thick silicon oxide layer ($SiO_2$). The buffer layer used is realized by two aluminum oxide layers whose thickness is 200 nm. Each of the aluminum oxide layers is formed by sputtering of aluminum in an oxygen atmosphere. The sputtering power for formation of the lower aluminum oxide layer is lower than the sputtering power for formation of the upper aluminum oxide layer. In the mold bases 10c, 10d, and 80b, the thickness of the aluminum layer is 1000 nm.

Anodization is performed on the mold bases 10c, 10d, and 80b. By the anodization, a porous alumina layer is formed over the surface of the aluminum layer of each of the mold bases 10c, 10d, and 80b. Specifically, the anodization is performed with an applied voltage of 80 V using an oxalic acid aqueous solution (concentration: 0.3 mass %, solution temperature: 18° C.). In this case, the thickness of the barrier layer is about 90 nm.

Then, etching is performed. The etching is performed using a phosphoric acid aqueous solution (concentration: 1 M, solution temperature: 30° C.). Note that, herein, for the mold bases 10c, 10d, and 80b, the increases of the average depth of the micropores are 15.7±2.5 nm, 10.5±1.5 nm, and 6.3±1.0 nm, respectively. Specifically, for the mold base 80b, the etching is performed such that the average depth of the micropores increases and exceeds a ⅕ of the average thickness of the barrier layer. For the mold bases 10c and 10d, the etching is performed such that the average depth of the micropores increases but does not exceed a ⅕ of the average thickness of the barrier layer.

Thereafter, the anodization and the etching are repeated. Both the anodization and the etching are performed under the conditions that have previously been described. Note that, for either of the mold bases 10c, 10d, and 80b, the process is ended with the anodization step that is performed after the final etching cycle has been finished.

Among the mold bases 10c, 10d, and 80b, the total duration of the anodization that is performed through a plurality of cycles and the total number of etching cycles are equal in order that the final size of the micropores (minute recessed portions) is equal among the mold bases 10c, 10d, and 80b. The total anodization duration is about 275 seconds. The total etching duration is about 100 minutes. Since the total duration of the anodization that is performed through a plurality of cycles and the total number of etching cycles are equal among the mold bases 10c, 10d, and 80b as described above, the final shape (depth, pore diameter) of the micropores (minute recessed portions) is generally equal among the obtained moth-eye molds 100c, 100d, and 800b. The results of two peeling tests that were carried out on the obtained moth-eye molds 100c, 100d, and 800b are shown in Table 2.

TABLE 2

|  | Mold 800b | Mold 100c | Mold 100d |
| --- | --- | --- | --- |
| Number of anodization cycles/Anodization duration | 5 cycles/ 55 sec | 7 cycles/ 39 sec | 11 cycles/ 25 sec |
| Number of etching cycles/Etching duration | 4 cycles/ 25 min | 6 cycles/ 16 min 40 sec | 10 cycles/ 10 sec |
| Increase of depth of micropores (nm) | 15.7 ± 2.5 | 10.5 ± 1.5 | 6.3 ± 1.0 |
| First peeling test (w/crosscut) | ◯ | ◯ | ◯ |
| Second peeling test (w/o crosscut) | 5 | 0 | 0 |

In the first peeling test, in the molds 800b, 100c, and 100d, an adhesive tape (Kapton tape manufactured by Permacel) was tightly placed onto the aluminum layer and then peeled off from the aluminum layer. The aluminum layer which was removed together with the peeled adhesive tape was checked with a human eye. In Table 2, "◯" means that no part of the aluminum layer was removed from the region on which the adhesive tape was tightly placed. In either of the moth-eye molds 100c, 100d, and 800b, removal of the aluminum layer would not occur. Here, an organic insulating layer which is made of acrylic melamine is provided on the surface of the base instead of PET which relatively readily causes removal of the aluminum layer, and the acrylic melamine undergoes a plasma ashing treatment. These are probably the reasons that removal of the aluminum layer would not occur in any of the moth-eye molds 100c, 100d, and 800b.

In the second peeling test, in the molds 800b, 100c, and 100d, the aluminum layer was cut into a matrix of 5×5 squares, each having a size of 1 cm×1 cm, using a utility knife, with the incision reaching the surface of the organic insulating layer. An adhesive tape (Kapton tape manufactured by Permacel) was tightly placed onto the aluminum layer so as to cover a region of the cut squares and then peeled off from the aluminum layer. The number of squares which were removed together with the peeled adhesive tape was counted. In the moth-eye mold 800b, 5 squares were removed, whereas in the moth-eye molds 100c and 100d, none of the squares were removed. Thus, in the moth-eye molds 100c and 100d for which the etching was performed such that the average depth of the micropores increased but did not exceed a ⅕ of the average thickness of the barrier layer, deterioration of the adhesive property is prevented.

It is appreciated from the results of Table 1 and Table 2 that the crystal condition of an aluminum layer that is formed on the surface of the base varies depending on the organic insulating material at the surface of the base. Specifically, when the organic insulating material at the surface of the base is made of acrylic melamine, occurrence of vacancies in the aluminum layer can be prevented, and as a result, deterioration of the adhesive property is prevented.

Hereinafter, FIG. 13(a) to FIG. 13(d) are SEM images of the surfaces of aluminum layers provided on bases which have different organic insulating materials at their surfaces. The magnification of the SEM is about 50000. In FIG. 13(a) to FIG. 13(d), the organic insulating materials at the surfaces of the bases are TAC, PET, acrylic melamine, and acrylic urethane, respectively. Note that, herein, acrylic melamine is formed by means of spray painting, and acrylic urethane is formed by means of electrodeposition. FIG. 14 is a SEM image of the surface of an aluminum layer which is formed on an organic insulating layer that is made of an acrylic urethane electrodeposition material.

Figure 13:
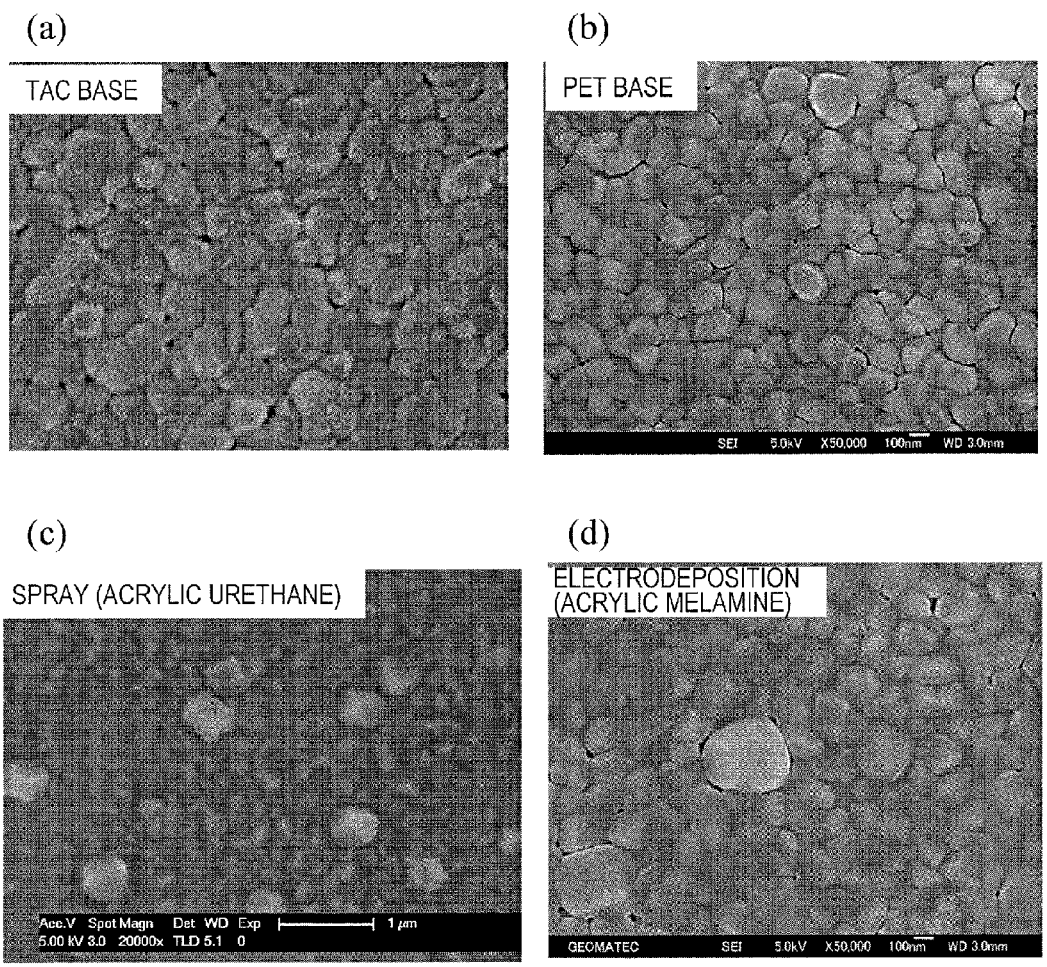
FIG. 13 (a) to (d) are SEM images of surfaces of aluminum layers formed on bases with different surfaces.
Figure 14:
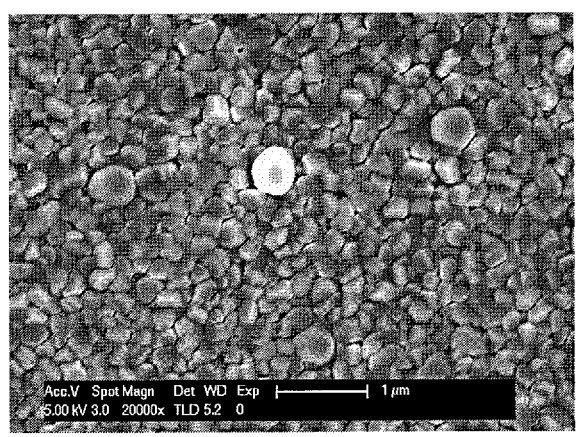
FIG. 14 A SEM image of a surface of an aluminum layer formed on a base which had a surface that was made of an electrodeposition material.

As appreciated from FIG. 13 and FIG. 14, the proportion, size, and shape of the vacancies formed in the aluminum layer vary depending on the organic insulating material at the surface of the base. Thus, the difference of the organic insulating material at the surface of the base leads to the difference of the state of the aluminum layer that is formed on the surface of the base. Note that, in general, the vacancies of the aluminum layer that is formed on a base which has a surface that is made of the organic insulating material are larger than the vacancies of the aluminum layer that is formed on a glass base.

In the description provided above, the surface of the base 12 is made of the organic insulating material, but the present invention is not limited to this example. The base 12 used may be a glass base. For example, the glass base may be glass which contains alkali metal (soda lime glass).

Figure 15:
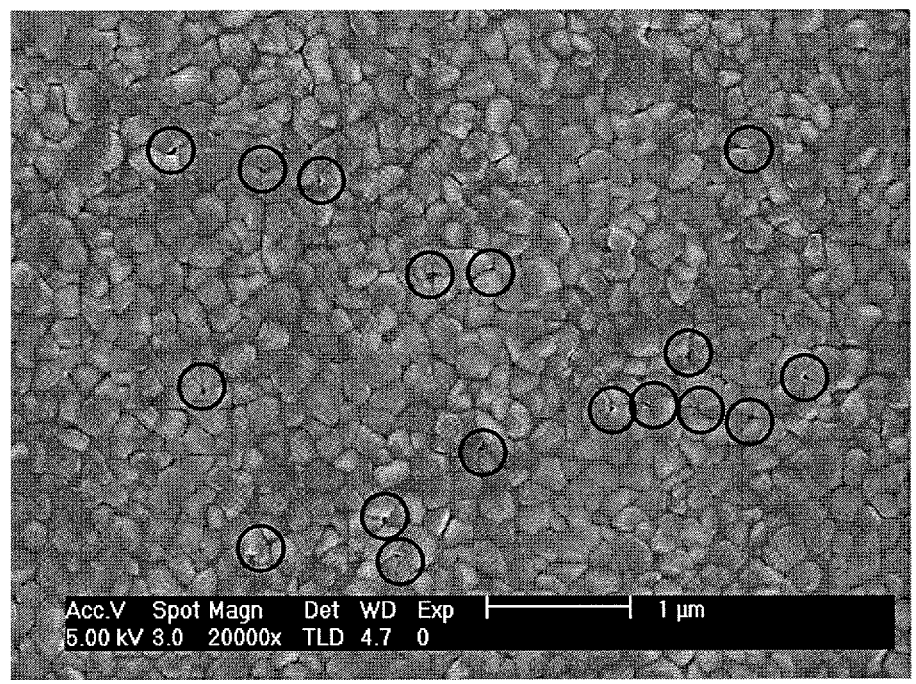
FIGS. 15 (a) and (b) are SEM images of surfaces of aluminum layers which were formed on a glass base.
Figure 15:
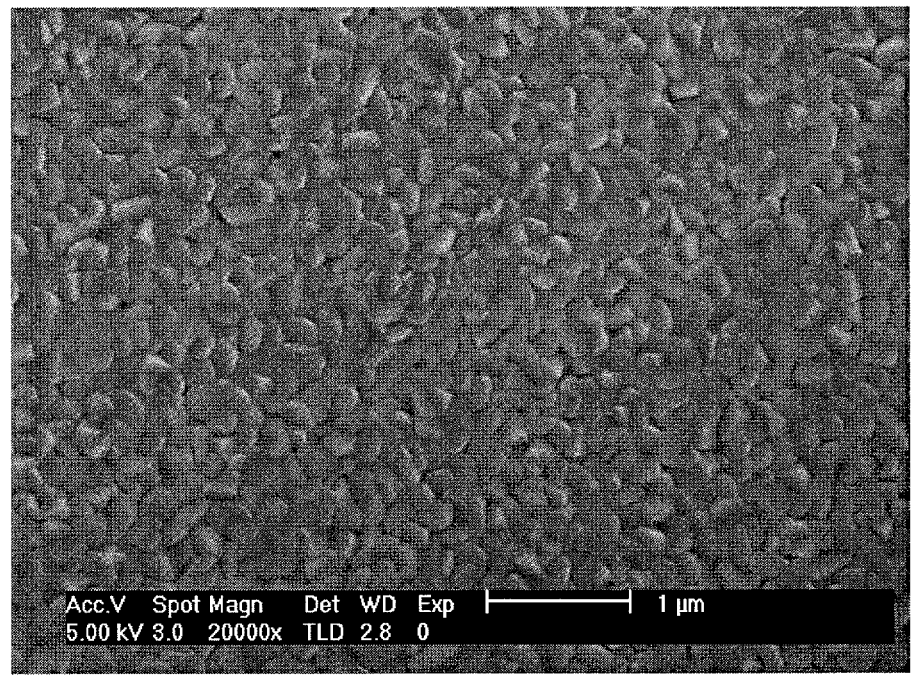

FIG. 15(a) is a SEM image of the aluminum layer 18 in a mold base 10 in which the base 12 used was a glass base. For FIG. 15(a), a 1000 nm thick aluminum layer 18 was continuously formed.

As appreciated from the comparison of FIG. 13 and FIG. 14 with FIG. 15(a), the mold base 10 in which the glass base 12 was used has a smaller number of vacancies in the aluminum layer 18 than a base in which at least the surface was made of the organic insulating material, and the adhesive property of the aluminum layer 18 can further be improved. Note that, herein, the aluminum layer 18 was formed by continuously performing sputtering. However, the aluminum layer 18 may be formed through a plurality of separate cycles.

FIG. 15(b) is a SEM image of the aluminum layer 18 in the mold base 10 in which the base 12 was a glass base. Here, a 1000 nm thick aluminum layer 18 was formed through 5 cycles, in each of which a 200 nm thick aluminum layer was formed. Specifically, the formation of the aluminum film 18 is interrupted for 5 minutes every time a 200 nm thick aluminum layer is formed. During the interruption, supply of the operation gas as well as generation of plasma are preferably interrupted. This enables to prevent an increase of the substrate temperature. As appreciated from the comparison of FIG. 15(a) and FIG. 15(b), forming the aluminum layer 18 through a plurality of separate cycles enables to further reduce the number of the vacancies of the aluminum layer 18. As a result, the adhesive property of the aluminum layer 18 can further be improved.

INDUSTRIAL APPLICABILITY

According to the present invention, deterioration of the adhesive property of the aluminum layer can be prevented. An antireflection element is preferably produced using such a moth-eye mold.

REFERENCE SIGNS LIST 10 mold base
12 base
14 inorganic underlayer
16 buffer layer
18 aluminum layer
19 porous alumina layer
19a porous layer
19b barrier layer
19b micropores (minute recessed portions)

The invention claimed is:

1. A method for manufacturing a mold which has an inverted moth-eye structure over its surface, the inverted moth-eye structure having a plurality of recessed portions whose two-dimensional size viewed in a direction normal to its surface is not less than 10 nm and less than 500 nm, the method comprising the steps of:
   (a) providing a mold base, the mold base including a base, an inorganic underlayer, made of an inorganic oxide or an inorganic nitride, provided on the base, a buffer layer, containing aluminum and either of oxygen or nitrogen, provided on the inorganic underlayer, and an aluminum layer provided on the buffer layer;
   (b) partially anodizing the aluminum layer to form a porous alumina layer, the porous alumina layer having a porous layer which defines a plurality of minute recessed portions and a barrier layer which is provided at a bottom of each of the plurality of minute recessed portions; and
   (c) after step (b), bringing the porous alumina layer into contact with an etching solution to perform etching, thereby enlarging the plurality of minute recessed portions of the porous alumina layer,
   wherein in step (c) the etching is performed such that an average depth of the plurality of minute recessed portions increases but does not exceed a $1/7$ of an average thickness of the barrier layer before the etching.

2. The method of claim 1, wherein in step (c) the average thickness of the barrier layer before the etching is not less than 5 nm and not more than 250 nm.

3. The method of claim 2, wherein in step (c) the average thickness of the barrier layer before the etching is not less than 5 nm and not more than 180 nm.

4. The method of claim 3, wherein in step (c) the average thickness of the barrier layer before the etching is not less than 85 nm and not more than 95 nm.

5. The method of claim 4, wherein in step (c) an increase of the average depth is not less than 5 nm and not more than 12 nm.

6. The method of claim 1, further comprising the step of:
   (d) after step (c), further anodizing the aluminum layer to grow the plurality of minute recessed portions.

7. The method of any of claim 1, wherein in step (c) a phosphoric acid aqueous solution is used as the etching solution.

8. The method of claim 1, wherein in step (a) the buffer layer includes an aluminum oxide layer.

9. The method of claim 8, wherein the aluminum oxide layer is formed by sputtering of aluminum in an oxygen atmosphere.

10. A mold which is manufactured according to the manufacturing method as set forth in claim 1, wherein the porous alumina layer has the inverted moth-eye structure over its surface.

11. An antireflection film which is produced using the mold as set forth in claim 10, the antireflection film having a surface which is provided with a moth-eye structure.

* * * * *